United States Patent [19]
Hansen et al.

[11] Patent Number: 5,842,686
[45] Date of Patent: *Dec. 1, 1998

[54] PATTERNED NOISE DAMPING COMPOSITE

[75] Inventors: Richard M. Hansen, Oshkosh, Wis.; Scott R. Dobrusky, Chicago; Edward J. Vydra, Norhtbrook, both of Ill.

[73] Assignee: Pre Finish Metals Incorporated, Elk Grove Village, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 551,406

[22] Filed: Nov. 1, 1995

[51] Int. Cl.$^6$ ....................................................... F16M 1/00
[52] U.S. Cl. ...................... 267/140; 267/136; 188/73.37
[58] Field of Search ............................ 188/73.37, 250 E, 188/381; 207/90, 141, 136, 140, 153, 292; 428/76, 246, 323, 324, 327

[56] References Cited

U.S. PATENT DOCUMENTS

| | | |
|---|---|---|
| 3,078,969 | 2/1963 | Campbell et al. . |
| 3,327,812 | 6/1967 | Lazan . |
| 3,357,519 | 12/1967 | Anderson et al. . |
| 3,640,836 | 2/1972 | Oberst et al. ............................ 161/165 |
| 3,658,635 | 4/1972 | Eustice ..................................... 161/190 |
| 3,966,026 | 6/1976 | Filderman ............................... 188/73.5 |
| 4,373,615 | 2/1983 | Melinat ................................... 188/73.1 |
| 4,663,224 | 5/1987 | Tabata et al. ............................ 428/246 |
| 4,902,548 | 2/1990 | Cholat-Serpoud et al. ............. 428/102 |
| 4,911,062 | 3/1990 | Heyman ................................... 89/36.02 |
| 5,063,098 | 11/1991 | Niwa et al. ................................. 428/76 |
| 5,099,962 | 3/1992 | Furusu et al. ......................... 188/73.37 |
| 5,118,562 | 6/1992 | Johnson et al. .......................... 428/327 |
| 5,143,755 | 9/1992 | Moore, III et al. ...................... 427/373 |
| 5,213,879 | 5/1993 | Niwa et al. ............................... 428/213 |
| 5,219,633 | 6/1993 | Sabee ....................................... 428/109 |
| 5,232,785 | 8/1993 | Kita .......................................... 428/457 |
| 5,271,142 | 12/1993 | Moore, III et al. ..................... 29/469.5 |
| 5,336,708 | 8/1994 | Chen ........................................ 524/474 |
| 5,407,034 | 4/1995 | Vydra et al. .......................... 188/73.37 |
| 5,502,931 | 4/1996 | Munir ......................................... 52/144 |
| 5,515,950 | 5/1996 | Kwolek ........................... 188/250 E X |
| 5,538,774 | 7/1996 | Landin et al. ........................... 428/64.1 |
| 5,552,209 | 9/1996 | McCutcheon ........................... 428/209 |

FOREIGN PATENT DOCUMENTS

| | | |
|---|---|---|
| 540332 | 5/1993 | European Pat. Off. ............ 188/73.37 |
| 6039962 | of 0000 | Japan . |
| 300530 | 12/1990 | Japan ................... 188/73.37 |
| 93/13329 | 7/1993 | WIPO ................................ 188/250 E |

*Primary Examiner*—Peter M. Poon
*Attorney, Agent, or Firm*—Emrich & Dithmar

[57] ABSTRACT

A noise damping composite includes a viscoelastic layer disposed between a pair of constraining metal layers, the viscoelastic layer including a pattern of adjacent stripes of different viscoelastic materials. Stripes of two or three different materials are disclosed. The viscoelastic layer can be applied in either liquid or solid form. In the former, it may be provided with mica platelets distributed throughout the layer.

16 Claims, 5 Drawing Sheets

Fig. 9 TEMPERATURE VS. LOSS FACTOR (PRIOR ART)

Fig. 10 TEMPERATURE VS. LOSS FACTOR

Fig. 11 TEMPERATURE VS. LOSS FACTOR

Fig. 12 TEMPERATURE VS. LOSS FACTOR (PRIOR ART)

PATTERNED NOISE DAMPING COMPOSITE

BACKGROUND OF THE INVENTION

1. Field of the Invention

The present invention relates to damping structure for damping of vibrations and, in particular, noise-producing vibrations. The invention has particular application to damping structures for vibrating systems to inhibit noise.

2. Description of the Prior Art

In certain systems, vibration can produce unwanted noise. For example, in conventional brakes, such as disk brakes, automobile body panels, product wrappers and other systems subject to friction and/or vibration, the frictional or vibrational forces may result in squealing or other noises. In order to suppress such noise, attempts have been made to fix a damping structure, including viscoelastic material, to the vibrating system to absorb or damp the noise-producing vibrations.

It is known that the ability of a viscoelastic material to damp vibrations, known as its "loss factor," is a function of temperature and frequency. Since, in normal operation, many systems may be subjected to a wide range of operating temperatures, the loss factor can vary considerably over the operating temperature range. Thus, while a particular viscoelastic material may effectively damp noise-producing vibrations at one temperature in the range, it may be relatively less effective at other temperatures in the range. Similarly, a particular viscoelastic material may damp some vibration frequencies better than others.

In order to broaden the temperature range over which a particular damping structure can effectively damp noise-producing vibrations, it is known to utilize a stacked or layered damping structure utilizing different types of viscoelastic material in different layers, the different types being designed to have peak loss factors at different temperatures. Such an arrangement is disclosed, for example, in U.S. Pat. No. 5,099,962. However, these multi-layered constructions can be difficult and expensive to manufacture.

SUMMARY OF THE INVENTION

It is a general object of the present invention to provide an improved vibration damping structure which avoids the disadvantages of prior damping structures while affording additional structural and operating advantages.

An important feature of the invention is the provision of a vibration damping composite which provides higher loss factor over a broadened temperature range.

In connection with the foregoing feature, it is another feature of the invention to provide a vibration damping composite of the type set forth which utilizes plural viscoelastic materials in a non-layered arrangement.

A still further feature of the invention is the provision of a vibration damping structure which enhances the loss factor characteristics of viscoelastic materials.

Yet another feature of the invention is the provision of a method for forming a vibration-damping composite of the type set forth.

Certain ones of these features are attained by providing a vibration damping composite comprising a substrate, and a single viscoelastic damping layer disposed on the substrate, the layer including a pattern of adjacent areas of different viscoelastic materials.

Still other features of the invention are attained by providing a vibration damping composite comprising a pair of constraining layers, and a single viscoelastic damping layer disposed between the constraining layers, the damping layer including a pattern of adjacent areas of different viscoelastic materials.

Further features of the invention are attained by providing a damping structure comprising a thin, substantially flat body of viscoelastic material, and a plurality of small mica platelets distributed throughout the body.

Still other features of the invention are attained by providing a method of forming a vibration damping composite comprising the steps of providing a substrate, and applying to the substrate a single viscoelastic damping layer including a pattern of adjacent areas of different viscoelastic materials.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
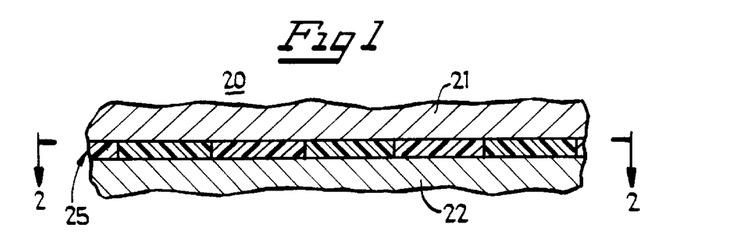
FIG. 1 is a fragmentary, cross-sectional view of a vibration-damping composite constructed in accordance with and embodying the features of a first embodiment of the present invention.
Figure 2:
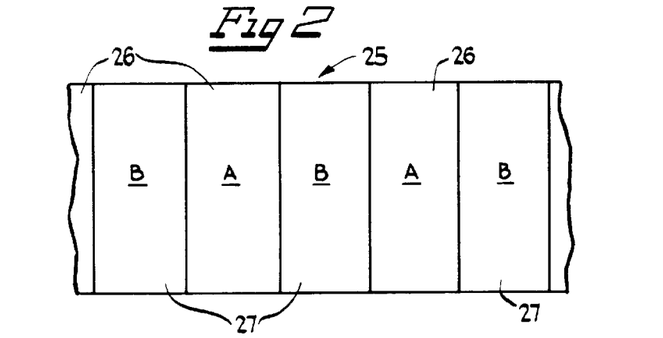
FIG. 2 is a fragmentary top plan view of the viscoelastic layer of the composite of FIG. 1, taken generally along the line 2—2 in FIG. 1.

Referring to FIGS. 1 and 2, there is illustrated a vibration damping composite 20 in accordance with a first embodiment of the present invention. The composite 20 includes a pair of constraining layers 21 and 22 sandwiching therebetween a viscoelastic layer 25. The constraining layers 21 and 22 are preferably formed of a suitable metal and are substantially thicker than the viscoelastic layer 25. However, it will be appreciated that the constraining layers 21 and 22 could be formed of other suitable materials having a sufficiently high Young's modulus. The composite 20 is illustrated as being an elongated, generally rectangular body, and the viscoelastic layer 25 includes two different types of viscoelastic material, respectively designated A and B. It is a fundamental aspect of the present invention that the viscoelastic materials A and B are, respectively, disposed in different adjacent areas arranged in a predetermined pattern. In the illustrated embodiment, these areas are in the form of alternating, contiguous, parallel stripes 26 and 27, each preferably having the same width and extending laterally of the composite 20, substantially perpendicular to the longitudinal axis thereof. Whereas, in FIG. 2, the alternating stripes 26 and 27 have widths less than one-half the length of the composite 20, they are arranged in a repeating pattern extending the length of the composite 20.

Figure 3:
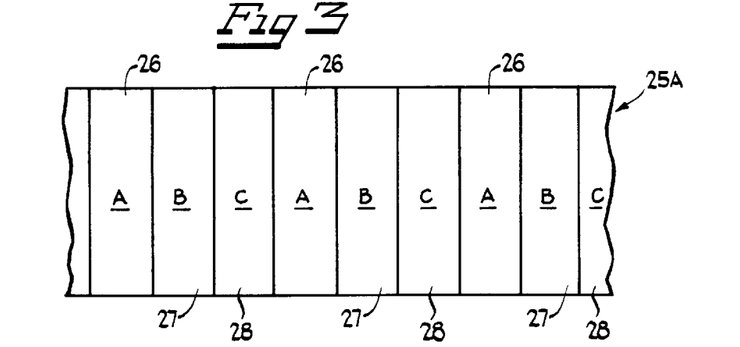
FIG. 3 is a view similar to FIG. 2 of another embodiment of the composite of the present invention.

Referring to FIG. 3, there is illustrated an alternative embodiment, designated 25A, of the viscoelastic layer in the composite 20. The viscoelastic layer 25A is similar to the viscoelastic layer 25, except that the repeating pattern of stripes includes three different stripes 26, 27 and 28, respectively comprised of three different viscoelastic materials A, B and C. It will be appreciated that patterns of stripes including other numbers of viscoelastic materials could also be utilized.

It is a significant aspect of the invention that applicants have found that the composite 20 results in a substantial broadening of the temperature range over which effective noise damping is achieved, as compared with composites utilizing only one of the viscoelastic materials A or B, without requiring any stacking or layering of the different viscoelastic materials. By way of illustration, reference is made to FIGS. 9–11, which are graphs of loss factor/ temperature characteristics of several composites. More specifically, each of FIGS. 9, 10 and 11 is a graph of the variation of the loss factor of the associated composite with temperature, for several of the lowest-frequency vibrational modes 1–5 of the composite.

Figure 9:
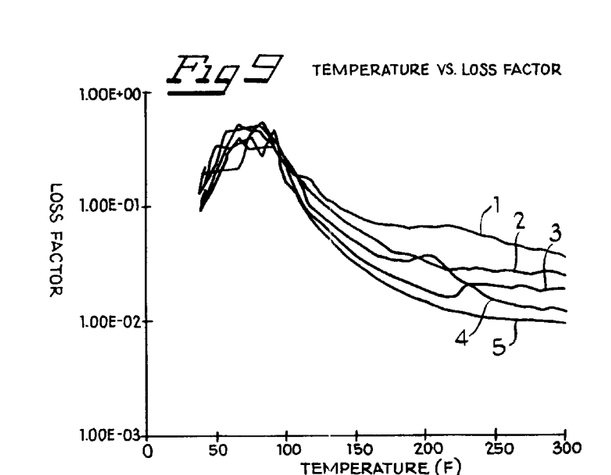
FIG. 9 is a graph of the relationship between loss factor and temperature for several different vibrational modes of a composite incorporating a prior art viscoelastic material.
Figure 10:
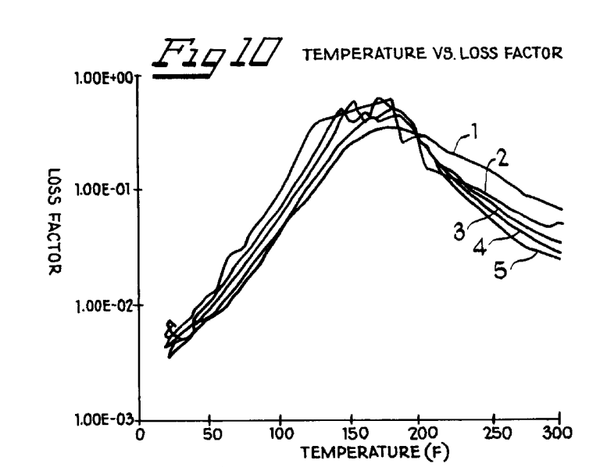
FIG. 10 is a graph similar to FIG. 9 for a composite incorporating another prior art viscoelastic material.

FIG. 9 relates to a composite incorporating a single viscoelastic layer made up of a single viscoelastic material A sandwiched between two constraining layers, each comprising a cold rolled steel sheet of 0.0123-inch thickness. It can be seen that this composite exhibits effective vibration damping (loss factor of $10^{-1}$ or higher) over a temperature range of about 40° F. to about 130° F. The graph of FIG. 10 is for a similar composite, which differs only in that the viscoelastic layer is made up of a single viscoelastic material B. It can be seen that this composite exhibits effective vibration damping over a temperature range of from about 110° F. to about 250° F.

Figure 11:
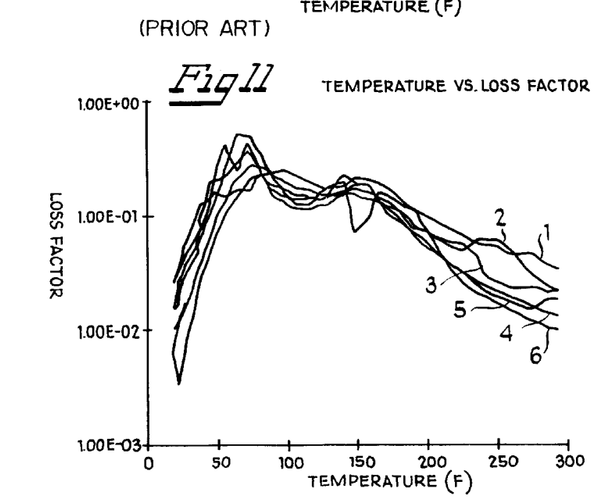
FIG. 11 is a graph similar to FIG. 9 for a composite in accordance with the present invention, incorporating the viscoelastic materials, characteristics of which are graphed in FIGS. 9 and 10.

FIG. 11 is for a composite in accordance with the present invention and, more particularly, substantially in accordance with the embodiment of FIGS. 1 and 2, wherein the constraining layers are the same as described above, and wherein the viscoelastic layer includes adjacent stripes of the viscoelastic materials A and B, with each of the stripes having a width about one-half the length of the composite, so that only one of each type stripe is present. It can be seen from FIG. 11 that this composite results in effective vibration damping over a temperature range of from about 40° F. to about 210° F. Thus, the present invention has substantially widened the temperature range over which effective vibration damping is achieved.

In the embodiments of FIGS. 1–3, the viscoelastic layer 25 is applied in liquid form. More particularly the stripes 26, 27 and 28 are applied by suitable means to a lower or substrate one of the constraining layers 21 and 22. Then, the coated substrate is heated to drive off solvents and, while the viscoelastic layer 25 or 25A is still tacky, the other one of the constraining layers 21 or 22 is laid on top of the viscoelastic layer, which serves to adhesively secure the constraining layers together.

However, the viscoelastic layer 25 or 25A may also be applied in film form. More particularly, film sheets of the viscoelastic materials A, B and C with release liners are cut into strips of the appropriate width. Then, the release liners are removed from the strips and they are adhered to the underlying or substrate one of the constraining layers 21 or 22 in the pattern illustrated in FIG. 2 or FIG. 3 to form the stripes 26, 27 and 28. Then the other constraining layer is laid on top, it being appreciated that the viscoelastic layer 25 will self-adhere to the constraining layers 21 and 22.

In the embodiments of FIGS. 1–3, the stripes 26–28 of viscoelastic material are arranged laterally of the composite 20, i.e., substantially perpendicular to the longitudinal axis thereof. However, it will be appreciated that other orientations of the stripes may be utilized. For example, referring to FIG. 4, there is illustrated a viscoelastic layer 25B comprising stripes 26 and 27 of two different viscoelastic materials A and B, wherein the stripes are oriented longitudinally of the composite. In FIG. 5 there is illustrated another embodiment of the viscoelastic layer designated 25C, in which the stripes 26 and 27 of two different composite materials A and B are oriented diagonally relative to the longitudinal axis of the composite. It will be appreciated that either of these orientations of FIGS. 4 and 5 could also be utilized where stripes of three or more viscoelastic materials are utilized. Applicants have found that the orientation of the stripes does not significantly affect the vibration-damping performance of the composite.

Whether or not a pattern of stripes repeats and the number of times that it repeats depends upon the overall dimensions of the composite and the widths of the individual stripes of viscoelastic material. In this regard, a number of different stripe widths may be effective. It is believed that stripes of viscoelastic material are effective where the stripe width is less than the length of the composite part divided by the number of different viscoelastic materials used, and is greater than one-fourth the wavelength of the lowest natural oscillation frequency of the composite part.

While, in the illustrated embodiment, the adjacent stripes are of equal width, it will be appreciated that, depending upon the nature of the viscoelastic materials used, adjacent stripes of different materials could have different widths. Furthermore, while striped patterns have been illustrated, it will be appreciated that the principles of the present invention apply to other patterns of adjacent areas of different viscoelastic materials.

In test constructional models of the invention, the constraining layers 21 and 22 have had a thickness substantially greater than the thickness of the viscoelastic layers 25–25C. For example, typically the viscoelastic layer has had a thickness of approximately 0.001 inch, while each of the constraining layers has had a thickness in the range of from about 0.01 to about 0.02 inch. However, it will be appreciated that the principles of the present invention could be applied to composite structures having other ratios between the thicknesses of the constraining and viscoelastic layers.

Figure 6:
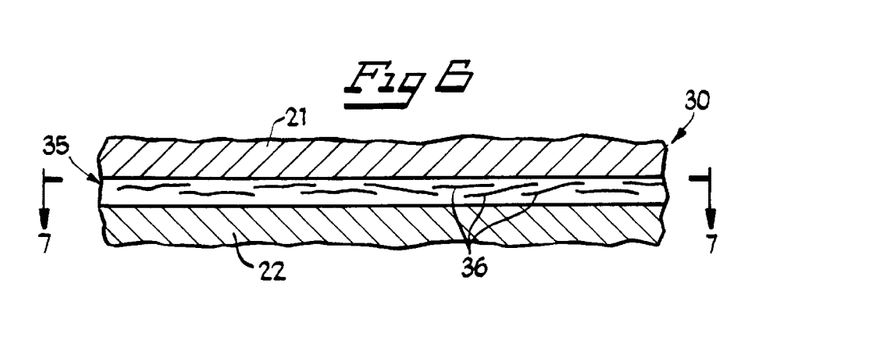
FIG. 6 is a view similar to FIG. 1 of another embodiment of the present invention.
Figure 7:
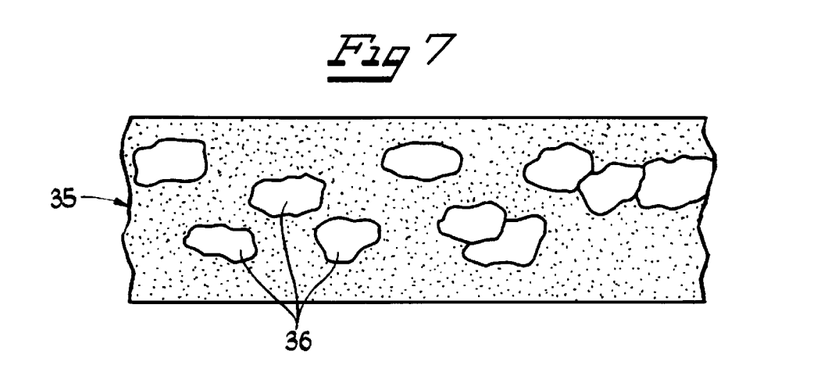
FIG. 7 is a top plan view of the viscoelastic layer of the composite of FIG. 6, taken along the line 7—7 in FIG. 6.

Referring now to FIGS. 6 and 7, there is illustrated a composite 30 in accordance with another embodiment of the present invention. The composite 30 utilizes the same constraining layers 21 and 22 as the composite 20, and has sandwiched therebetween a viscoelastic layer 35 formed of a suitable viscoelastic material. However, in this case the viscoelastic layer 35 has distributed therein a number of mica platelets 36. The viscoelastic layer 35 is applied in liquid form, and the mica platelets are stirred into the viscoelastic material before application to the constraining layer in an amount comprising approximately 5% by weight of the viscoelastic mixture.

Preferably, the mica platelets 36 are thin, plate-like structures, wherein the ratio of the maximum surface dimension to the thickness is in the range of from about 10 to about 100. In a tested embodiment of the invention, the maximum surface dimension of the mica platelets 36 is slightly greater than the thickness of the viscoelastic layer 35. More specifically, in an example wherein the thickness of the viscoelastic layer was 0.001 inch, the mica platelets 36 had a sieve size such that the maximum surface dimension was approximately 0.00175 inch and the platelet thickness was about 0.00001 inch.

Figure 14:
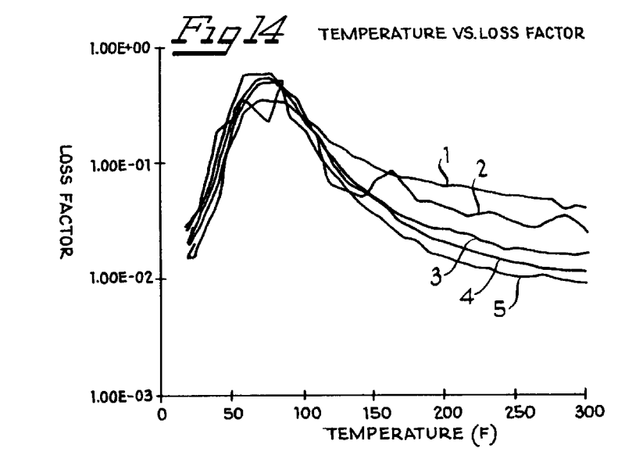
FIG. 14 is graph similar to FIG. 9, wherein the viscoelastic material includes 5% by weight of mica platelets.
Figure 15:
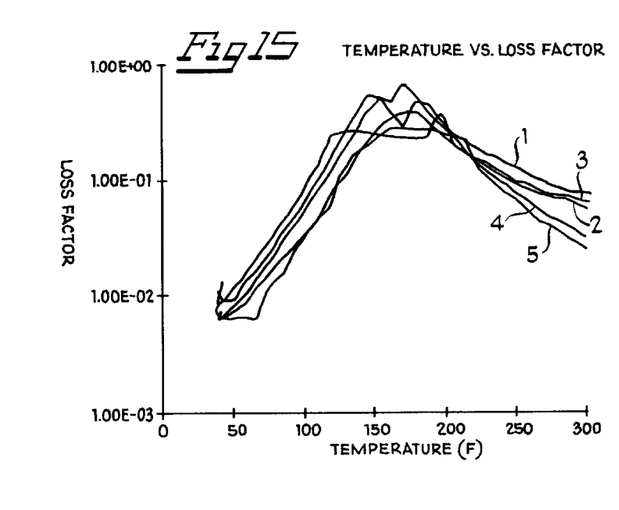
FIG. 15 is a graph similar to FIG. 10, wherein the composite material includes 5% by weight of mica platelets.

It has been found the inclusion of such mica platelets 36 in an amount approximately 5% by weight tends to elevate the peak vibration-damping effectiveness of the viscoelastic material. FIGS. 14 and 15 are, respectively, graphs of the variation of loss factor with frequency for the composites of FIGS. 9 and 10, with the exception that there has been added to the viscoelastic material in each case mica platelets 36 in an amount of 5% by weight. It can be seen from a comparison of these graphs that the addition of the mica platelets tends to slightly boost the loss factor/temperature characteristic curves for most of the vibration modes, particularly at the peak and at the upper and lower ends of the temperature range.

Figure 8:
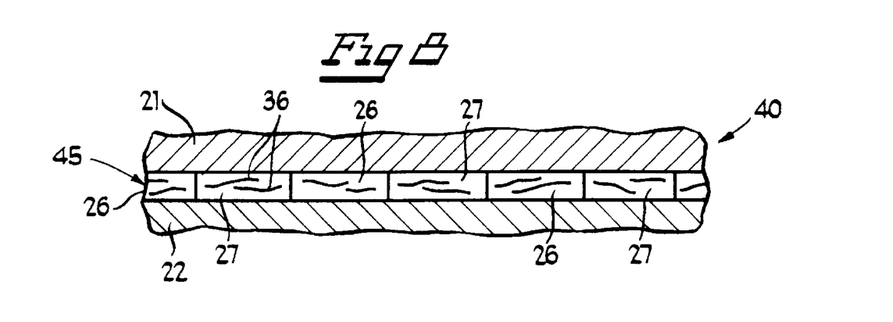
FIG. 8 is a view similar to FIG. 1 of a still further embodiment of the present invention.
Figure 16:
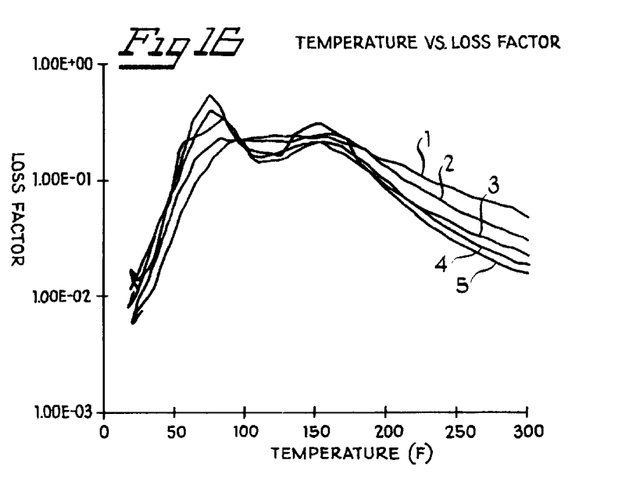
FIG. 16 is a graph similar to FIG. 11, wherein the viscoelastic materials include 5% by weight of mica platelets.

Referring to FIG. 8, there is illustrated a composite 40 which is the same as the composite 20 except that it has a viscoelastic layer 45 which includes 5% by weight of the mica platelets 36 in each of the stripes 26 and 27 of viscoelastic material. FIG. 16 is a graph of the loss factor/temperature characteristic curves for several of the lowest-frequency vibration modes for this composite. Comparison of FIG. 16 with FIG. 11 shows that the addition of the mica platelets 36 significantly raises the level of the characteristic curves over the temperature range in which effective vibration damping is achieved, i.e., from about 50° F. to about 210° F., particularly lifting the peak loss factors. Thus, the addition of the mica platelets 36 tends to compensate for the slight lowering of the peak loss factor values for the viscoelastic materials A and B which results from their combination in a striped composite. This lowering can be seen by comparing FIG. 11 with FIGS. 9 and 10.

The features of the present invention will be further illustrated by the following examples.

EXAMPLE 1

Two constraining layers were provided, each comprising a rectangular sheet of cold rolled steel 1"×6" with a thickness of 0.0123 inch. Two different viscoelastic materials in liquid form were then striped onto a surface of one of the constraining layers. One of the viscoelastic materials was a self-cross linking, acrylic solution, pressure-sensitive adhesive of the type sold by Morton International under the trade name MORSTIK®. The other viscoelastic material was a liquid damping polymer of the type sold by 3M Company under the trade designation SCOTCHDAMP® SJ-2125. In applying the viscoelastic material, a laterally extending dam was placed across the substrate constraining layer midway along its length and puddles of the two viscoelastic materials were, respectively, deposited on the constraining layer on opposite sides of the dam. Each puddle was metered beneath a draw-down bar to a coating thickness of approximately 0.001 inch. The coated substrate was then placed in an oven to drive off the solvents and, while still tacky, the other constraining layer was laid on the viscoelastic layer. There resulted a composite like that shown in FIGS. 1 and 2 except for the width of the stripes.

The composite of Example 1 was tested by clamping one end in cantilever fashion and then magnetically exciting the distal end into vibration. The loss factor/temperature characteristic is shown in FIG. 11 for several of the lowest-frequency vibrational modes excited.

Comparative Examples 2 and 3

The same procedure was followed as in Example 1, except that there was no striping, the viscoelastic layer in Example 2 comprising only the MORSTIK® material, and the viscoelastic layer in Example 3, comprising only the SCOTCHDAMP® material. The composites were again tested in the manner described in Example 1. The resulting loss factor/temperature characteristic for Example 2 is shown in FIG. 9, while the corresponding characteristic for Example 3 is shown in FIG. 10.

EXAMPLE 4

Figure 12:
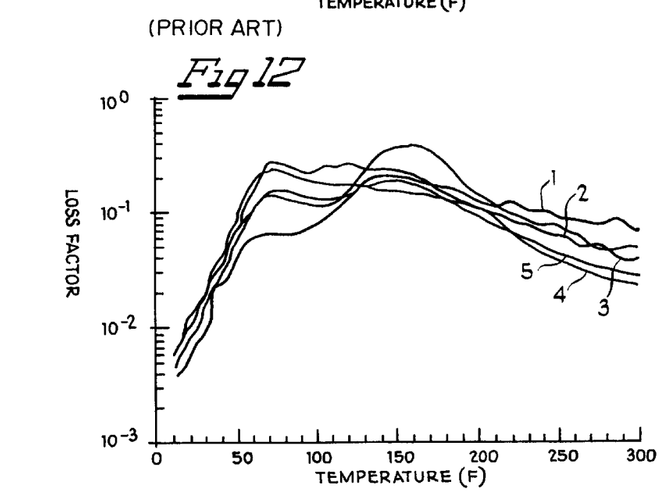
FIG. 12 is a graph similar to FIG. 11 for another composite in accordance with the present invention.

Example 1 was repeated, with the exception that each of the constraining layers had a thickness of 0.010 inch and the viscoelastic stripes were applied in film form and were 1-inch wide. In particular, film sheets of the two viscoelastic materials were cut into 1"×1" strips and three each were placed across the substrate layer in alternating fashion to produce an arrangement like that in FIGS. 1 and 2. Then the other constraining layer was laid on top of the viscoelastic layer and the resulting composite was tested in the manner described above for Example 1. FIG. 12 shows the loss factor/temperature characteristic for several of the lowest-frequency vibrational modes excited.

EXAMPLE 5

Figure 13:
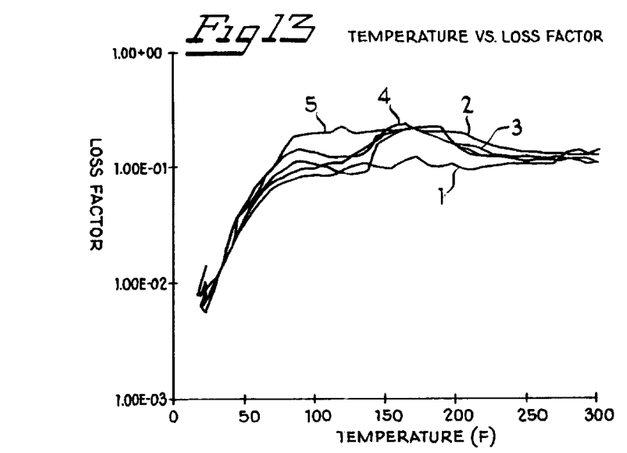
FIG. 13 is a graph similar to FIG. 11 of another composite in accordance with the present invention incorporating three viscoelastic materials.

Example 1 was repeated, except that the viscoelastic layer included stripes of a third viscoelastic material and each of the stripes was two inches wide and the stripes were applied in film form. The third viscoelastic material was a silicone-based polymer of the type sold by Flexcon Company, Inc. under the trade designation "DENSIL 1078." Film sheets of each of the viscoelastic materials were cut into 1"×2" strips, the release liner was removed, and the strips were laid across the substrate constraining layer with the one-inch dimension extending transversely of the constraining layer and the two-inch dimension extending longitudinally of the constraining layer. Then the other constraining layer was placed on top of the viscoelastic layer. The resulting composite was tested in the manner described above in connection with Example 1. FIG. 13 shows the loss factor/temperature of several of the lowest-frequency vibrational modes excited.

EXAMPLE 6

Example 1 was repeated, except that mica platelets were added to each of the viscoelastic materials before application to the substrate constraining layer. In particular, mica platelets of a sieve size such that the maximum surface dimension was about 0.00175 inch were mixed in each of the viscoelastic materials in an amount 5% by weight of the resulting mixture. The two viscoelastic materials with mica platelets added were then applied to the substrate constraining layer in accordance with the procedure of Example 1, the drawdown bar tending to flatten out the mica platelets so that they were inclined at relatively shallow angles to the surface of the substrate constraining layer. The resulting composite was of the type illustrated in FIG. 8. The composite was tested in accordance with the method described above in connection with Example 1. FIG. 14 shows the loss factor/temperature characteristic curves of the several lowest-frequency vibrational modes excited.

Comparative Examples 7 and 8

Comparative Examples 2 and 3 were repeated except that, in each case, 5% by weight of mica platelets of the type described in Example 6 were mixed with the viscoelastic material before application to the substrate constraining layer. In each case, the resulting composite was tested in the manner described above in connection with Example 1. FIGS. 15 and 16, respectively, show the loss factor/temperature characteristics of the several lowest-frequency vibrational modes excited in the composites of comparative Examples 7 and 8.

EXAMPLE 9

Figure 17:
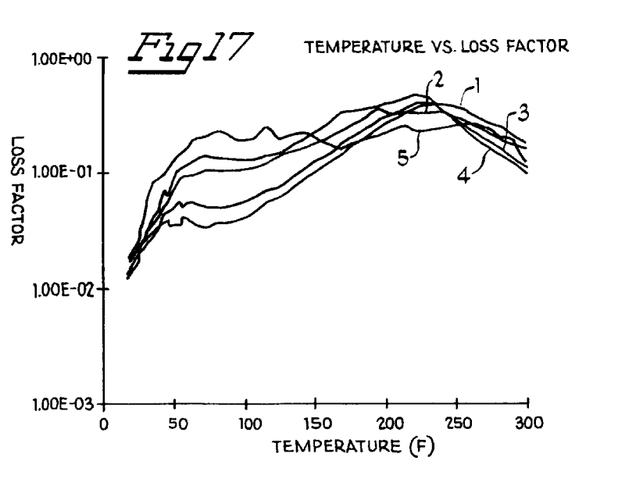
FIGS. 17–19, respectively, are graphs similar to FIG. 11, wherein the viscoelastic material stripes are oriented as in FIGS. 2, 4 and 5, respectively.

Two constraining layers were provided, each comprising a rectangular sheet of cold rolled steel 1"×6" with a thickness of 0.0123 inch. Two different viscoelastic materials in film form were then striped onto a surface of one of the constraining layers in the manner described in Example 4, except that each stripe was 0.5 inch wide. One of the viscoelastic materials was the MORSTIK® material described in Example 1, while the other viscoelastic material was the DENSIL 1078 material described in Example 5. The film sheets of the two viscoelastic materials were cut into 0.5"×1" strips and then were placed laterally across the substrate layer in alternating fashion, with the one-inch dimension extending perpendicular to the longitudinal axis of the substrate, to produce an arrangement like that in FIGS. 1 and 2. Then the other constraining layer was laid on top of the viscoelastic layer and the resulting composite was tested in the manner described above for Example 1. FIG. 17 shows a loss factor/temperature characteristic for several of the lowest-frequency vibrational modes excited.

EXAMPLE 10

Figure 4:
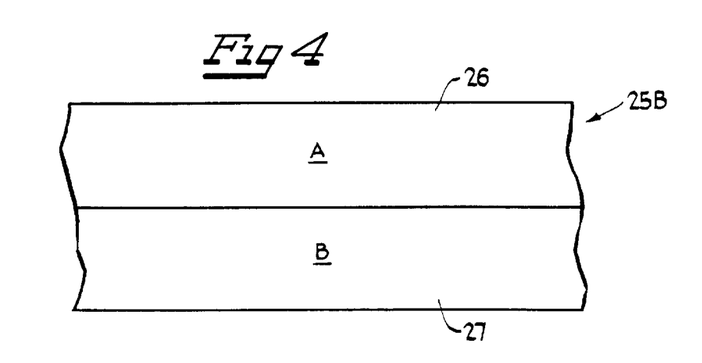
FIG. 4 is a view similar to FIG. 2, wherein the viscoelastic areas are stripes extending longitudinally rather than laterally of the substrate.
Figure 5:
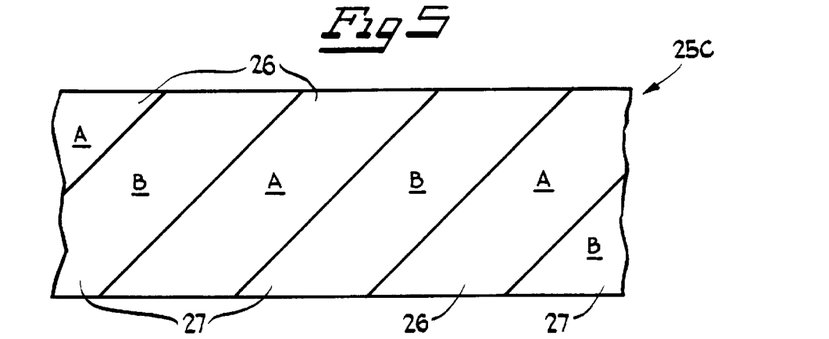
FIG. 5 is a view similar to FIG. 4, wherein the viscoelastic areas are diagonal.
Figure 18:
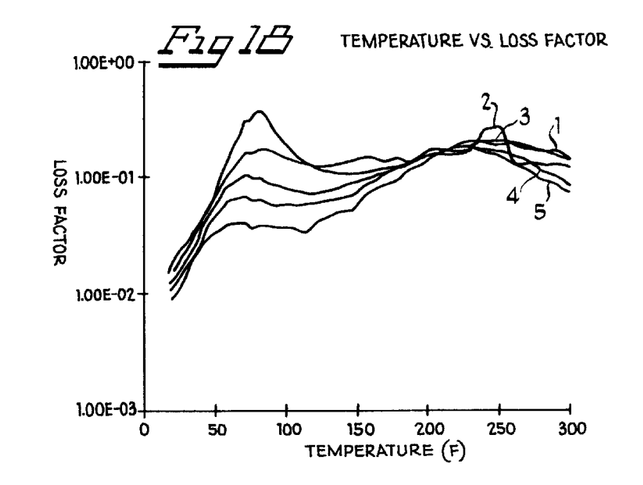

Example 9 was repeated, except that each of the film sheets was cut into strips of 0.5"×6", and a strip of each material was placed on the substrate layer with the six-inch dimension parallel to the longitudinal axis of the substrate, in the manner shown in FIG. 4. The composite was tested in the manner described above for Example 1. FIG. 18 shows the loss factor/temperature characteristic for several of the lowest-frequency vibrational modes excited.

EXAMPLE 11

Figure 19:
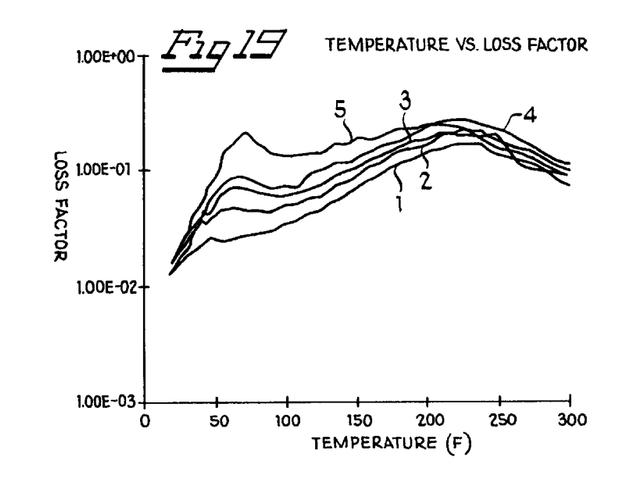

Example 9 was repeated, except that the film sheets were cut into 0.5" wide strips with 45° angled ends and placed on the substrate layer in alternating fashion diagonally at an angle of 45° to the longitudinal axis of the substrate, to produce an arrangement like that in FIG. 5. The resulting composite was tested in the manner described above for Example 1. FIG. 19 shows the loss factor/temperature characteristic for several of the lowest-frequency vibrational modes recited.

The foregoing examples are illustrative of the principles of the invention. However, it will be appreciated that the present invention could utilize any of many other viscoelastic materials suitable for vibration damping applications, as well as other types and configurations of constraining layers.

From the foregoing, it can be seen that there has been provided an improved vibration-damping composite which optimizes the temperature range over which effective vibration damping can be achieved, while avoiding stacking or layering of viscoelastic materials.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A vibration damping composite adapted for damping noise-producing vibrations in a medium having a plurality of vibrational modes each having a different natural oscillation frequency, said composite comprising: a substrate, and a single viscoelastic damping layer disposed on said substrate, said layer including a pattern of laterally adjacent areas of different viscoelastic materials, said pattern including three laterally adjacent stripes respectively formed of different viscoelastic materials, each of said stripes having a width greater than one-fourth the wavelength of the vibrations in the medium in the lowest-frequency vibrational mode.

2. The composite of claim 1, wherein each of said stripes is contiguous with and substantially parallel to and of substantially the same width as adjacent stripes.

3. The composite of claim 1, wherein said substrate is formed of metal.

4. The composite of claim 1, wherein said pattern is repeating.

5. A vibration damping composite adapted for damping noise-producing vibrations in a medium having a plurality of vibrational modes each having a different natural oscillation frequency, said composite comprising: a pair of constraining layers, and a single viscoelastic damping layer disposed between said constraining layers, said damping layer including a pattern of laterally adjacent areas of different viscoelastic materials, said pattern including three laterally adjacent stripes respectively formed of different viscoelastic materials, each of said stripes having a width greater than one-fourth the wavelength of the vibrations in the medium in the lowest-frequency vibrational mode.

6. The composite of claim 5, wherein said constraining layers are formed of metal.

7. The composite of claim 5, wherein said constraining layers are substantially thicker than said damping layer.

8. The composite of claim 5, wherein each of said stripes is contiguous with and substantially parallel to and of substantially the same width as adjacent stripes.

9. The composite of claim 8, wherein one of said constraining layers forms a substrate which is elongated and has a longitudinal axis, said stripes extending perpendicular to said axis.

10. The composite of claim 8, wherein one of said constraining layers forms a substrate which is elongated and has a longitudinal axis, said stripes extending parallel to said axis.

11. The composite of claim 8, wherein one of said constraining layers forms a substrate which is elongated and has a longitudinal axis, said stripes extending diagonally with respect to said axis.

12. A method of forming a vibration damping composite comprising the steps of: providing a substrate, and applying to the substrate only a single viscoelastic damping layer in liquid form including a pattern of contiguous side-by-side areas, each area having opposite side edges and being contiguous with adjacent areas only along said side edges, with the viscoelastic material of each area being different from the viscoelastic material of any area contiguous therewith.

13. The method of claim 12, wherein the damping layer includes a plurality of small mica platelets distributed throughout said layer.

14. The method of claim 12, wherein the applying step includes placing a barrier dam across the substrate, applying puddles of two different viscoelastic materials in liquid form on the substrate respectively on opposite sides of the barrier dam, and metering each puddle beneath a draw-down bar to a predetermined coating thickness.

15. The method of claim 14, and further comprising the step of heating the coated substrate to drive off solvents.

16. The method of claim 15, and further comprising the step of placing a constraining layer on the viscoelastic damping layer subsequent to heating thereof and while it is still tacky.

\* \* \* \* \*

UNITED STATES PATENT AND TRADEMARK OFFICE
CERTIFICATE OF CORRECTION

PATENT NO. : 5,842,686

DATED : December 1, 1998

INVENTOR(S) : Richard M. Hansen, et al.

It is certified that error appears in the above-identified patent and that said Letters Patent is hereby corrected as shown below:

On the title page, item

[73] "Pre Finish Metals Incorporated" should be --Material Sciences Corporation.--

Signed and Sealed this

Twentieth Day of July, 1999

Attest:

Q. TODD DICKINSON

*Attesting Officer*  Acting Commissioner of Patents and Trademarks